July 3, 1962  L. A. GRUENEWAELDER  3,042,034
FACE MASKS

Filed April 21, 1958  2 Sheets-Sheet 1

INVENTOR.
LOU A. GRUENEWAELDER
BY
ATTORNEY

July 3, 1962 L. A. GRUENEWAELDER 3,042,034
FACE MASKS

Filed April 21, 1958 2 Sheets-Sheet 2

INVENTOR.
LOU A. GRUENEWAELDER
BY Alfred W Petchaft
ATTORNEY

United States Patent Office 3,042,034
Patented July 3, 1962

3,042,034
FACE MASKS
Lou A. Gruenewaelder, 6917 Pershing Ave.,
University City 5, Mo.
Filed Apr. 21, 1958, Ser. No. 730,005
3 Claims. (Cl. 128—146)

This invention relates to certain new and useful improvements in face masks.

In many industrial plants and institutions, workers are frequently exposed to harmful dust, fumes or vapors which, if inhaled in sufficient quantities or for prolonged periods of time, may result in injury to the respiratory systems or other internal organs of the body. Similarly, exposure to harmful fumes and vapors may occur in and around the home, particularly when hair sprays or insecticide sprays are used. The ordinary woven gauze face mask of the type used in hosptials is frequently too porous to effectively filter many types of fumes and vapors with the result that under many conditions this type of face mask affords little or no protection. Special purpose face masks are available for filtering out highly poisonous or toxic vapors, and these masks are highly effective and useful for certain purposes. However, a mask of this type is not needed in most instances of household and industrial use. Moreover, such masks are not only expensive, but are ordinarily unsightly and heavy and are, therefore, uncomfortable to wear.

It is, therefore, the primary object of the present invention to provide a face mask which effectively filters out harmful elements, such as dust, vapors, fumes, and the like, thus preventing such elements from entering the ears, nose, mouth, or respiratory system.

It is also an object of the present invention to provide a face mask of the type stated which is comfortable to wear and does not materially restrict normal breathing.

It is an additional object of the present invention to provide a face mask of the type stated which is easy to clean and sterilize.

It is a further object of the present invention to provide a face mask of the type stated which is light in weight and relatively inexpensive to manufacture.

With the above and other objects in view, my invention resides in the novel features of form, construction, arrangement, and combination of parts presently described and pointed out in the claims.

In the accompanying drawings (two sheets)—

Figure 3:
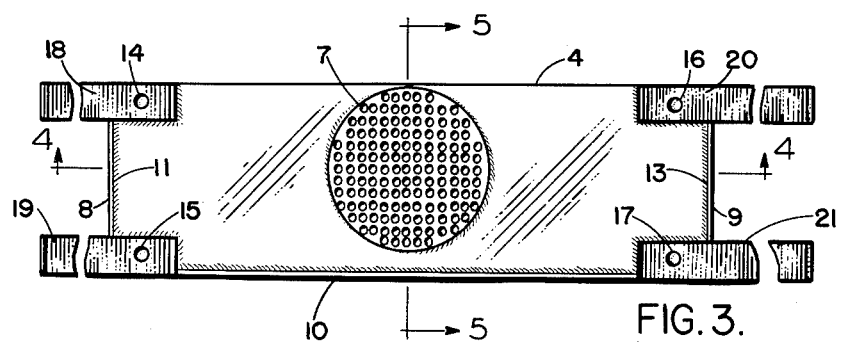
FIG. 3 is a top plan view of a completed face mask constructed in accordance with and embodying the present invention.
Figure 4:
Figure 5:
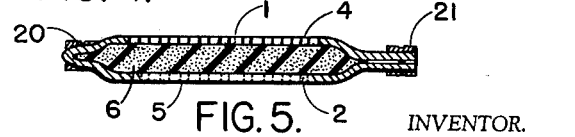
Figure 6:
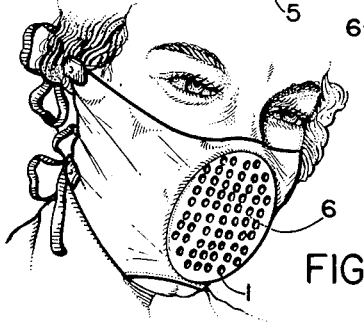
Figure 7:
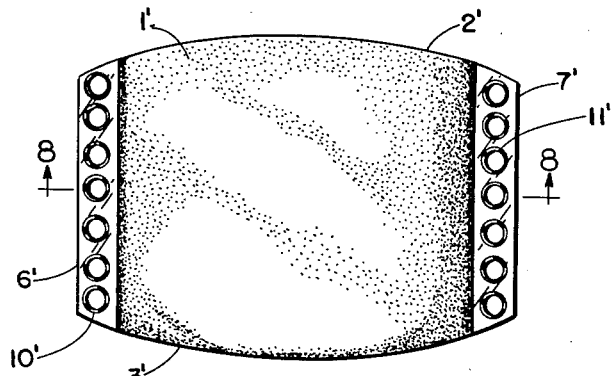
Figure 8:
Figure 9:
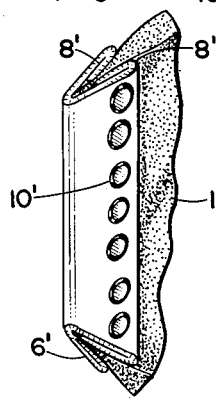
Figure 10:
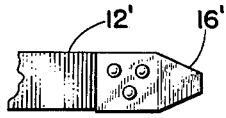
Figure 11:
Figure 12:
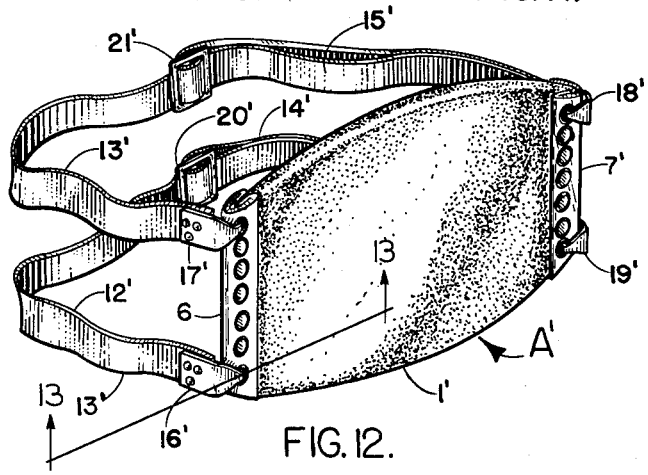

FIGS. 4 and 5 are fragmentary sectional views taken along lines 4—4 and 5—5 of FIG. 3;

FIG. 6 is a perspective view showing the manner of using the face mask;

FIG. 7 is a top plan view of the filtering element forming part of a modified form of face mask;

FIG. 8 is a sectional view taken along line 8—8 of FIG. 7;

FIG. 9 is a perspective view of one of the end binding strips forming part of the present invention;

FIG. 10 is a fragmentary top plan view of one of the head-encircling straps used with the filtering element in FIGS. 7 and 8;

FIG. 11 is a fragmentary elevational view of the strap in FIG. 10;

FIG. 12 is a perspective view of the modified form of face mask; and

Figure 13:
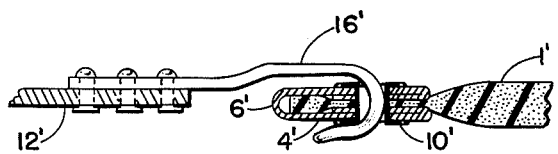

FIG. 13 is a fragmentary sectional view taken along line 13—13 of FIG. 12.

Figure 1:
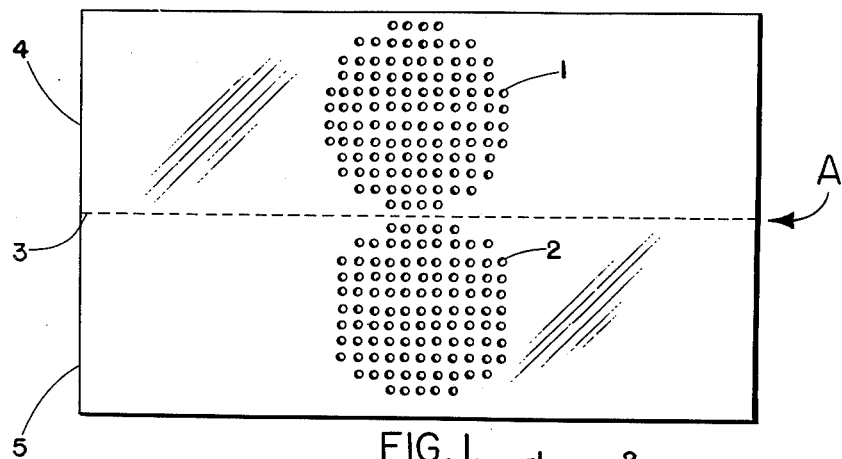
FIG. 1 is a top plan view of the mask body forming a part of the present invention.
Figure 2:
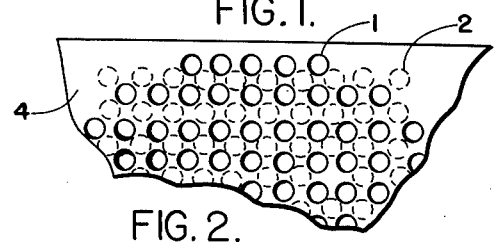
FIG. 2 is a fragmentary top plan view of the mask body after it has been lengthwise folded.

Referring now in more detail and by reference characters to the drawings, which illustrate a preferred embodiment of the present invention, A designates a rectangular sheet of substantially air impervious flexible material, such as polyvinyl chloride for example, and provided with two groups of perforations or holes 1, 2, which are disposed on either side of a fold line 3, the latter dividing the sheet A into top and bottom walls or plies 4, 5. The holes 1, 2, are so arranged that if the sheet A is folded along the line 3, and the walls 4, 5, are in facewise contact, the holes 1, 2, will be staggered or offset from each other, as shown in FIG. 2.

Disposed between the top and bottom plies 4, 5, in overlying relation to the holes 1, 2, is a disk-like porous filtering element 6, and the plies 4, 5, are heat-sealed together in a narrow band 7 which extends around the periphery of the filtering element 6 so as to hold the latter snugly and immovably in position. The filtering element 6 is preferably made of foamed polyurethane sponge, since this material is capable of being formed into sponges having extremely small pores and is, therefore, highly effective as a filtering medium. However, it should be understood that the filtering element 6 may be of other porous sponge-like materials. The side margins 8, 9, and longitudinal margin 10 of the plies 4, 5, are each heat-sealed together along narrow bands 11, 12, 13, respectively, and secured to the four corners of the ply 4 by means of heat seals 14, 15, 16, 17, are narrow tying straps 18, 19, 20, 21.

In use, the face mask is placed over the face, as shown in FIG. 6, with the filtering element 6 disposed over the nose and mouth and the plies 4, 5, covering the ears. The ends of the straps 18, 19, 20, 21, are then tied together at the back of the head. The sheets 4, 5, being flexible, readily conform to the contour of the face and effectively prevent air from entering the nose and mouth except through the filtering element 6. Moreover, since the holes 1, 2 are staggered or offset from each other, the path through which the air flows in the filtering element 6 is greater than would be the case if the holes were aligned. Consequently, by staggering the holes 1, 2, in the plies 4, 5, it is possible to filter out a larger amount of foreign matter from the air. The face mask can be readily washed, so as to flush impurities out of the filtering element 6, and water absorbed in the filtering element 6 during cleaning can be removed through the holes 1, 2. In connection with the present invention, it should also be noted that the width of the plies 4, 5, can be increased so as to extend over and protect the eyes, and, since the plies 4, 5, are transparent, vision is not obstructed.

It is also possible to provide a modified form of face mask A' which comprises a flat pad-like filter element 1', preferably formed of foamed polyurethane or other suitable sponge material and provided with arcuate longitudinal margins 2', 3', connected by spaced parallel transverse margins 4', 5'. Disposed around the transverse margins 4', 5', and substantially coextensive therewith are U-shaped binder strips 6', 7', having inwardly folded hems 8', 9', the latter being adapted to lie facewise against the opposite surfaces of the filtering element 1'. The binder strips 6', 7', and filtering element 1' are punched for receiving a plurality of hollow grommets 10', 11', which constrict the margins 4', 5', and secure the binder strips 6', 7', snugly on the filtering element 1'.

Provided for co-operation with the filtering element 1' is a plurality of flexible head-encircling straps 12', 13', 14', 15', each being provided on one end with a hook 16', 17', 18', 19', for selective engagement within any of the grommets 10', 11', as shown in FIGS. 12 and 13. If desired, the other ends of the straps 14', 15', may be provided with buckles 20', 21', for slidably receiving the ends 22', 23', of the straps 13', 14'.

The face mask A' is used in substantially the same manner as the face mask A previously described. As the face mask A' is placed over the face of the user, the straps 12', 13', 14', 15', will extend around the back of the head and the buckles 20', 21', permit adjustment of the length of the straps 13', 14', so as to hold the filtering element 1' snugly on the wearer's face. The filtering element A', being relatively large, effectively covers the mouth and nose of the wearer and filters out dust, fumes, and the like. It will be apparent that the hooks 16', 17', 18', 19', can be readily detached from the grommets 10', 11', and the filtering element 1' washed to remove foreign matter therefrom.

It should be understood that changes and modifications in the form, construction, arrangement, and combination of the several parts of the face mask may be made and substituted for those herein shown and described without departing from the nature and principle of my invention.

Having thus described my invention, what I claim and desire to secure by letters patent is—

1. A face mask comprising a flexible body portion having a plurality of marginally secured plies each of which is provided with a plurality of perforations in a defined area, said areas in the respective plies being in substantial registration, and a porous polyurethane filtering element of substantially greater area than said defined area, said filtering element being disposed between said plies, said plies also being secured together around the periphery of said filtering element so as to snugly confine the filtering element between the plies, said plies being substantially air impervious except at said perforations so that air passing through the plies will travel through said perforations and filtering element.

2. A face mask comprising a flexible body portion having a plurality of marginally secured plies each of which is provided with a plurality of perforations in a defined area, said areas in the respective plies being in substantial registration, a porous polyurethane filtering element of substantially greater area than said defined area, said filtering element being disposed between said plies, said plies also being secured together around the periphery of said filtering element so as to snugly confine the filtering element between the plies, said plies being substantially air impervious except at said perforations so that air passing through the plies will travel through said perforations and filtering element, and means on said body portion for securing the latter over the face of a wearer.

3. A face mask comprising a flexible body portion having a plurality of marginally secured plies each of which is provided with a plurality of perforations in a defined area, said areas in the respective plies being in substantial registration, the perforations in one ply being offset with respect to the perforations in another ply, and a porous polyurethane filtering element of substantially greater area than said defined area, said filtering element being disposed between said plies, said plies also being secured together around the periphery of said filtering element so as to snugly confine the filtering element between the plies, said plies being substantially air impervious execpt at said perforations so that air passing through the plies will travel through said perforations and filtering element.

References Cited in the file of this patent

UNITED STATES PATENTS

| | | |
|---|---|---|
| 1,142,990 | Stern | June 15, 1915 |
| 2,007,867 | Le Duc | July 9, 1935 |
| 2,293,928 | Beal | Aug. 25, 1942 |
| 2,515,009 | Hyghlago | July 11, 1950 |
| 2,723,935 | Rodman | Nov. 15, 1955 |
| 2,751,905 | Creelman | June 26, 1956 |
| 2,845,926 | Hill | Aug. 5, 1958 |
| 2,888,414 | Fuller | May 26, 1959 |
| 2,908,943 | Miller | Oct. 20, 1959 |

FOREIGN PATENTS

| | | |
|---|---|---|
| 982,289 | France | Jan. 24, 1951 |
| 1,052,690 | France | Sept. 23, 1953 |